United States Patent [19]
Shin

[11] Patent Number: 5,880,878
[45] Date of Patent: Mar. 9, 1999

[54] IMAGE AMPLIFYING TUBE SYSTEM FOR DAY AND NIGHT COMBINED USE IN OBSERVATION EQUIPMENT

[75] Inventor: Soo-Bong Shin, Gumi, Rep. of Korea

[73] Assignee: SamSung Electronics Co., Ltd., Suwon, Rep. of Korea

[21] Appl. No.: 777,140

[22] Filed: Dec. 30, 1996

[30] Foreign Application Priority Data

Dec. 29, 1995 [KR] Rep. of Korea ............... 64215/1995

[51] Int. Cl.[6] .......................... G02B 23/08; G02B 23/12
[52] U.S. Cl. ........................... 359/353; 359/400
[58] Field of Search ............................. 359/353, 350, 359/402, 400, 405, 821, 399

[56] References Cited

U.S. PATENT DOCUMENTS

| | | |
|---|---|---|
| 2,946,255 | 7/1960 | Bolay . |
| 3,464,757 | 9/1969 | Schmidt . |
| 3,529,882 | 9/1970 | Schmidt . |
| 3,712,702 | 1/1973 | Schmidt . |
| 4,449,787 | 5/1984 | Burbo et al. ............... 359/410 |
| 4,687,922 | 8/1987 | Lemonier et al. . |
| 4,822,994 | 4/1989 | Johnson et al. . |
| 4,961,278 | 10/1990 | Johnson et al. . |
| 5,084,780 | 1/1992 | Phillips . |
| 5,140,151 | 8/1992 | Weiner et al. . |
| 5,282,082 | 1/1994 | Espie et al. . |
| 5,434,704 | 7/1995 | Connors et al. ............... 359/403 |
| 5,497,266 | 3/1996 | Owen . |
| 5,528,418 | 6/1996 | Bowman, Jr. . |

*Primary Examiner*—Jon W. Henry
*Attorney, Agent, or Firm*—Robert E. Bushnell, Esq.

[57] ABSTRACT

An image amplifying tube system for a day and night combined use in an observation equipment includes an image amplifying tube assembly mounted on the daytime periscope of the naked-eye sighting device, in which the image amplifying tube assembly swerves from the optical path during the daytime sighting and moves into the optical path during the nighttime sighting. Consecutively, the image amplifying tube is positioned at a specific focusing distance on the optical path by a vertical and horizontal moving mechanism. In this way, it may be possible to use the periscope both in the daytime and in the nighttime.

19 Claims, 4 Drawing Sheets

Fig. 4A
Fig. 4B
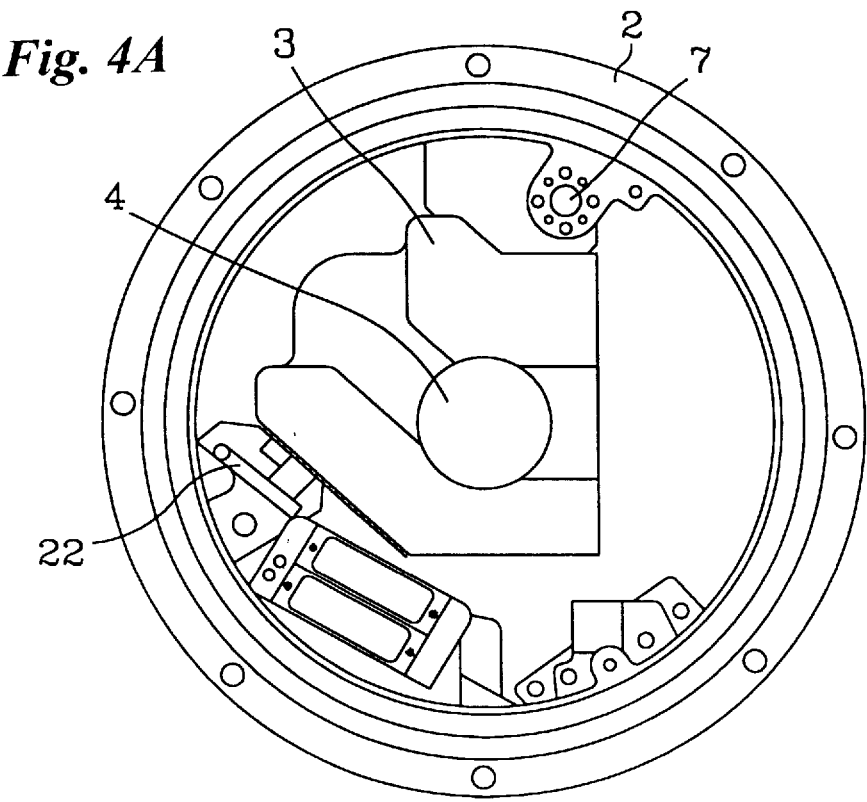
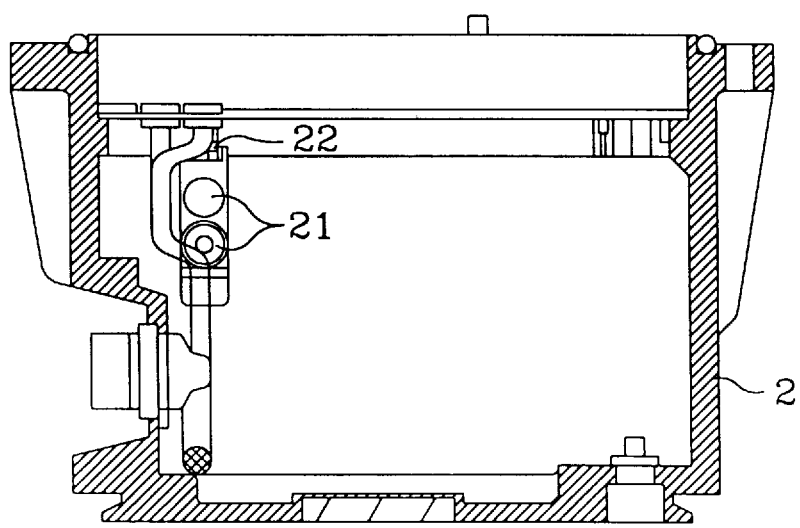

IMAGE AMPLIFYING TUBE SYSTEM FOR DAY AND NIGHT COMBINED USE IN OBSERVATION EQUIPMENT

CLAIM OF PRIORITY

This application makes claims all benefits accruing under 35 U.S.C. §119 from an application for IMAGE AMPLIFYING TUBE SYSTEM FOR DAY AND NIGHT COMBINED USE IN OBSERVATION EQUIPMENT earlier filed in the Korean Industrial Property Office on the 29th day of December 1995 and there duly assigned Ser. No. 64215/1995.

BACKGROUND OF THE INVENTION

1. Field of the Invention

The present invention relates to an image amplifying tube system for a day and night combined use in an observation equipment, and more particularly to an image amplifying tube system that is usable both in the daytime and in the nighttime, in which an image amplifying tube assembly having an image amplifying tube is mounted on a naked-eye sighting periscope.

2. Description of the Related Art

Conventionally, in order to observe the exterior from the interior of a vehicle, a naked-eye sighting periscope is used for the daytime sighting and, however, a separate night sighting equipment should be installed to the naked-eye sighting periscope for the nighttime sighting, thereby causing inconvenience attributable to for the frequent installation and removal of the night sighting equipment.

SUMMARY OF THE INVENTION

It is therefore an object of the present invention to provide an image amplifying tube system for a day and night combined use in an observation equipment, in which an image amplifying tube assembly having an image amplifying tube is mounted on a frame of a daytime periscope in a naked-eye sighting device.

It is another object of the present invention to provide an image amplifying tube system for a day and night combined use in an observation equipment, wherein an image amplifying tube assembly swerves from an optical path during the daytime sighting and is accurately located in the optical path during the nighttime sighting so as to make the night sighting possible.

According to an aspect of the present invention, an image amplifying tube system for a day and night combined use in an observation equipment includes an image amplifying tube assembly mounted on the daytime periscope of the naked-eye sighting device for making an observation of the exterior of the vehicle, in which the image amplifying tube assembly swerves from the optical path during the daytime sighting and moves into the optical path during the nighttime sighting. Consecutively, the image amplifying tube is positioned at a specific focusing distance on the optical path by a vertical and horizontal moving mechanism. In this way, it may be possible to use the periscope both in the daytime and in the nighttime.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 4A and 4B show plane and cross-sectional views, respectively, of an image amplifying tube system for a day and night combined use in an observation equipment according to the present invention.

DETAILED DESCRIPTION OF THE PREFERRED EMBODIMENT

Figure 1A:
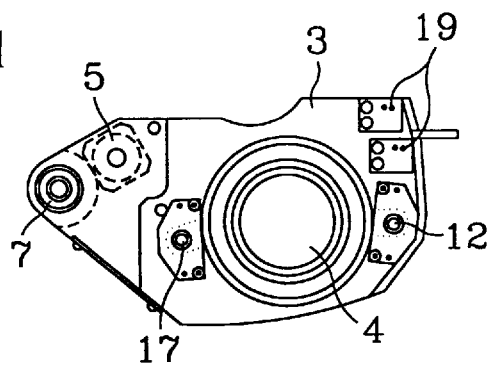
FIGS. 1A through 1C are diagrams of an image amplifying tube assembly for a day and night combined use in an observation equipment according to the present invention.
Figure 1B:
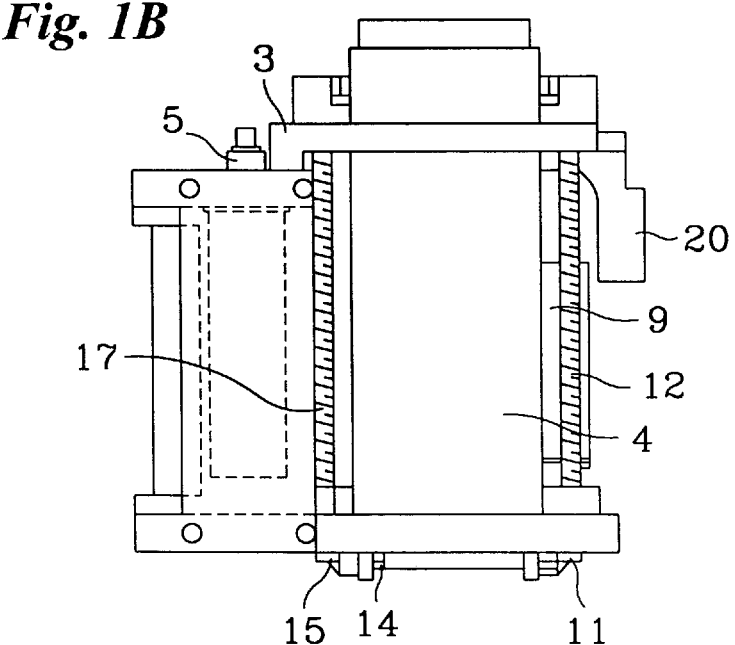
Figure 1C:
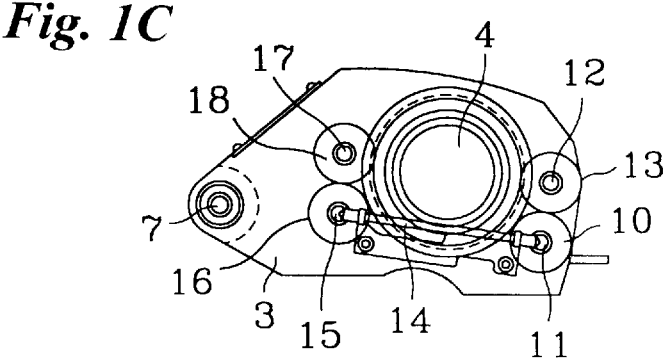
Figure 2:
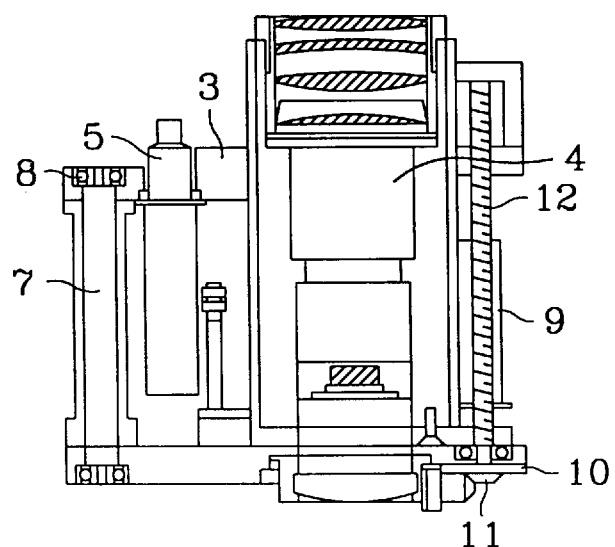
FIG. 2 is a cross-sectional view of an image amplifying tube assembly for a day and night combined use in an observation equipment according to the present invention.
Figure 3A:
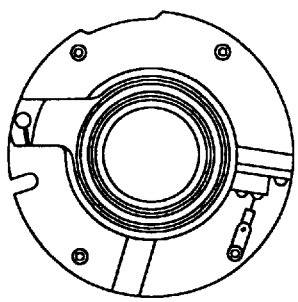
FIGS. 3A and 3B are top and cross-sectional views, respectively, of an image amplifying tube system for a day and night combined use in an observation equipment according to the present invention.
Figure 3B:
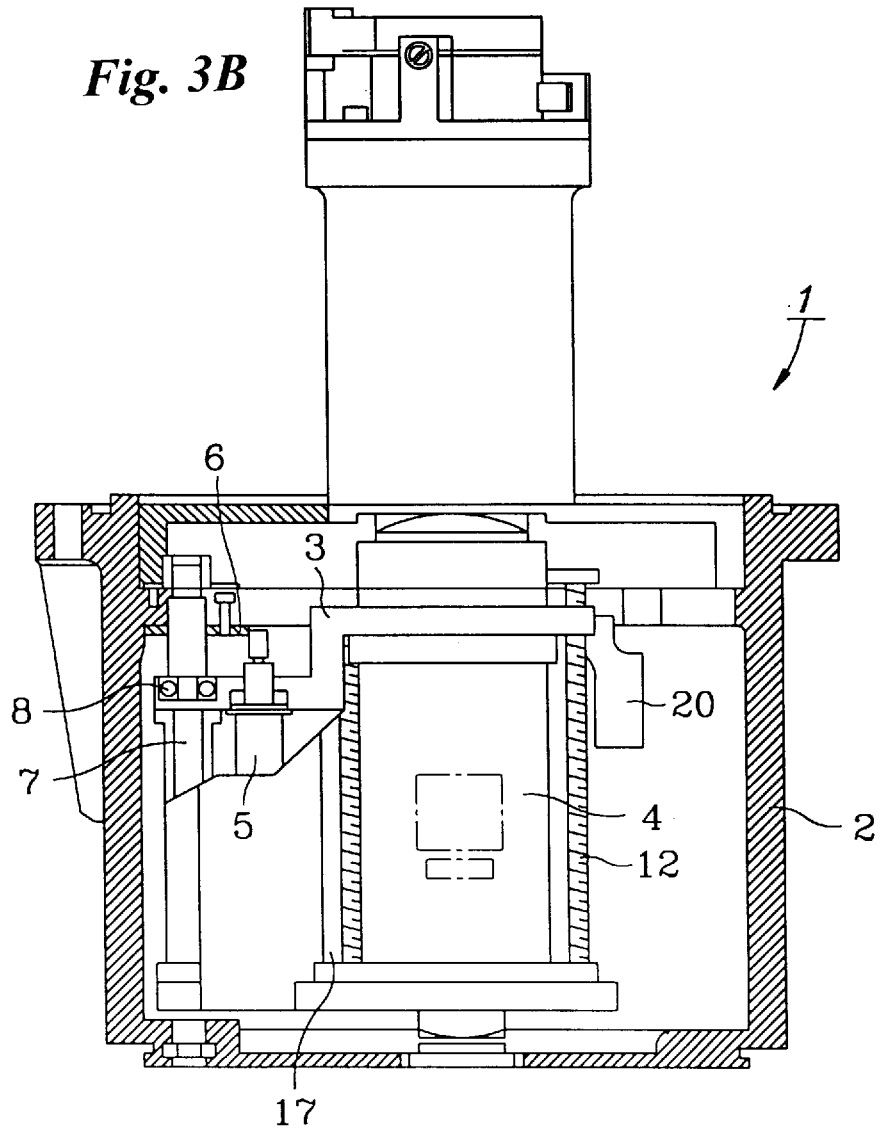

Referring to FIGS. 1A through 4B, an image amplifying tube assembly 3 including an image amplifying tube 4 is mounted on a frame 2 so as to allow a periscope 1 of a naked-eye sighting device to be usable both in the daytime and in the nighttime, in which a horizontal driving motor 5 mounted on the frame 2 is engaged with a horizontal driving gear 6 of the image amplifying tube assembly 3, so that the image amplifying tube assembly 3 moves horizontally across an optical path, centering on a ball bearing 8 of a shaft 7. A spur gear 10 and a first bevel gear 11 are mounted on an axle of a vertical driving motor 9. The spur gear 10 is engaged with a gear 13 of a lead screw 12. A shaft gear 14 has an end engaged with the first bevel gear 11 and another end engaged with a second bevel gear 15. A spur gear 16 is mounted on the second bevel gear 15. The image amplifying tube 4 is mounted on the lead screws 12 and 17 so as to be movable up and down. The image amplifying tube 4 includes a limit switch 19 mounted on an upper end thereof and the image amplifying tube assembly 3 includes a stopper 20 mounted thereon. The frame 2 includes a magnet 21 and a hook 22 mounted thereon, respectively. The vertical driving motor 9 drives the lead screws 12 and 17, to move the image amplifying tube 4 up and down so as to accurately locate it in the optical path. The first and second bevel gears 11, 15 and the spur gears 10, 16 constitute double combination gears, respectively.

In operation, the image amplifying tube assembly 3 having the image amplifying tube 4 is mounted on the frame 2 of the periscope 1 in the naked-eye sighting device. During the daytime sighting, the image amplifying tube assembly 3 moves horizontally to swerve from the optical path completely. Alternatively, during the nighttime sighting, the image amplifying tube assembly 3 moves horizontally by the horizontal driving motor 5 to be accurately located in the optical path, in which the image amplifying tube assembly 3 operates in association with the horizontal and vertical driving motors 5 and 9, the spur gears 10 and 16, the bevel gears 11 and 15, the limit switch 19 for applying and cutting-off the power, and the ball bearing 8. Thereafter, a vertical moving mechanism is driven to locate the image amplifying tube assembly 3 at a specific focusing distance on the optical path and then, activate the image amplifying tube 4, so as to make the night sighting possible.

It is noted from the above description that during the daytime sighting, the image amplifying tube assembly 3 moves horizontally by the horizontal driving motor 5 to swerve from the optical path completely, so as to make the daytime sighting possible.

Alternatively, during the nighttime sighting, the image amplifying tube assembly 3 moves horizontally, centering on the ball bearing 8, by driving the horizontal driving motor 5, so that the image amplifying tube 4 may move in the optical path. In the meanwhile, the horizontal movement of the image amplifying tube assembly 3 is stopped by the limit switch 19 mounted thereon.

Then, in order to place the image amplifying tube 4 at an accurate focusing point on the optical path by moving it vertically, the vertical driving motor 9 drives the spur gear 10 and the first bevel gear 11 mounted on the shaft thereof. Then, the second bevel gear 15 is also driven in the same direction by the shaft gear 14 engaged with the first bevel gear 11. Thus, the spur gear 10 drives the gear 13 of the lead screw 12, and the spur gear 16 mounted on the shaft of the second bevel gear 15 drives a gear 18 of the lead screw 17. Therefore, the lead screws 12 and 17 rotate in the same direction, and the image amplifying tube 4 coupled to the lead screws 12, 17 moves upward so as to be located in the accurate focusing point on the optical path.

In the meanwhile, the image amplifying tube 4 is controlled not to move upward excessively, by the stopper 20 mounted on the image amplifying tube assembly 3, so that the image amplifying tube 4 may accurately inserted into the optical path, thereby making the night sighting possible.

If the periscope 1, being in the above state, is to be used during the daytime, the vertical driving motor 9 rotates inversely, so as to inversely rotate the gears 13 and 18 of the lead screws 12 and 17 engaged with the spur gears 10 and 16, respectively. Then, the image amplifying tube 4 moves downward out of the optical path to move into the image amplifying tube assembly 3. In the meanwhile, the horizontal driving motor 5 rotates inversely to horizontally move the image amplifying tube assembly 3. Then, the image amplifying tube assembly 3 swerves completely from the optical path and then, becomes unmovable by the magnet 21 and the hook 22 mounted on the frame 2, thereby making the daytime sighting possible.

As described heretofore, the present invention includes the image amplifying tube assembly mounted on the daytime periscope of the naked-eye sighting device, in which the image amplifying tube assembly swerves from the optical path during the daytime sighting and moves into the optical path during the nighttime sighting, so as to use the periscope both in the daytime and in the nighttime, thereby offering convenience to the user.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. An image amplifying tube system, comprising:
   an image amplifying tube assembly with an image amplifying tube for using a periscope of a naked-eye sighting device both during daytime and during nighttime, said image amplifying tube assembly being mounted on a frame of said periscope;
   a first driving motor mounted on said frame, said first driving motor being engaged with a first driving gear of said image amplifying tube assembly accommodating movement of the image amplifying tube assembly approximately perpendicularly with respect to an optical path;
   a second driving motor with a shaft bearing a first spur gear and a first bevel gear;
   a first lead screw with a first lead screw gear engaged with said first spur gear;
   a shaft gear with an end engaged with said first bevel gear;
   a second bevel gear engaged with another end of said shaft gear;
   a second spur gear mounted on a shaft of said second bevel gear, so as to allow said second spur gear to be engaged with a second lead screw gear of a second lead screw; and
   said image amplifying tube being mounted on said first and second lead screws to reciprocate in a direction approximately parallel to said optical path.

2. The image amplifying tube system for a day and night combined use according to claim 1, said image amplifying tube assembly further comprising:
   a limit switch for controlling movement perpendicular to said optical path by applying and cutting-off a power; and
   a stopper for stopping movement parallel to said optical path of said image amplifying tube at a predetermined position.

3. The image amplifying tube system for a day and night combined use according to claim 1, further comprising a magnet and a hook mounted on said frame for fixing the image amplifying tube assembly.

4. The image amplifying tube system for a day and night combined use according to claim 1, wherein said first bevel gear and said first spur gear constitutes a double combination gear.

5. The image amplifying tube system for a day and night combined use according to claim 1, wherein said first and second bevel gears rotate in a same direction with a forward or reverse rotation of said second driving motor; and the gears of the lead screws engaged with the respective spur gears also rotate in a same direction, so as to allow said image amplifying tube to be movable in a direction parallel to said optical path.

6. The image amplifying tube system for a day and night combined use according to claim 1, wherein said second bevel gear and said second spur gear constitutes a double combination gear.

7. An image amplifying tube system, comprising:
   an image amplifying tube;
   a frame of a periscope;
   a first driving motor mounted on said frame, said first driving motor being engaged with a first driving gear of said image amplifying tube assembly accommodating movement of the image amplifying tube assembly to move perpendicularly with respect to an optical path; and
   a second driving motor with a shaft for moving said image amplifying tube assembly in a direction parallel to said optical path.

8. The image amplifying tube system of claim 7, said second driving motor further comprising a first spur gear and a first bevel gear mounted to said shaft of said second driving motor.

9. The image amplifying tube system of claim 8, said second driving motor further comprising a first lead screw with a first lead screw gear engaged with said first spur gear.

10. The image amplifying tube system of claim 9, said second driving motor further comprising a shaft gear with an end engaged with said first bevel gear.

11. The image amplifying tube system of claim 10, said second driving motor further comprising a second bevel gear engaged with another end of said shaft gear.

12. The image amplifying tube system of claim 11, said second driving motor further comprising a second spur gear mounted on a shaft of said second bevel gear, accommodating movement of said second spur gear to be engaged with a second lead screw gear of a second lead screw.

13. The image amplifying tube system of claim 12, said second driving motor further comprising said image amplifying tube mounted on said first and second lead screws so as to be movable in a direction parallel to said optical path.

14. The image amplifying tube system of claim 7, further comprising:

a ball bearing; and a ball bearing shaft for said ball bearing, said ball bearing centers on said ball bearing shaft as said amplifier tube moves across said optical path.

15. The image amplifying tube system of claim 14, the movement perpendicular to said optical path of said image amplifying tube is stopped by a limit switch.

16. The image amplifying tube system of claim 13, the movement of said image amplifying tube in a direction parallel to said optical path is controlled and limited by a stopper mounted on the image amplifying tube assembly, and accommodates movement of the image amplifying tube to accurately be inserted into the optical path.

17. An image amplifying tube system, comprising:

a frame for a periscope;

an image amplifying tube mounted on said frame; and a first driving motor and a second driving motor accommodating movement of said image amplifying tube in a direction perpendicular to an optical path and in a direction parallel to said optical path respectively, wherein said optical path passes through said image amplifying tube when said image amplifying tube system is used during conditions of low ambient light and in a substantially dark environment, and said optical path does not pass through said image amplifying tube when said image amplifying tube system is used in daylight.

18. The image amplifying tube system of claim 17, wherein said first driving motor accommodates the movement of said image amplifying tube causing said optical path to either pass through said image amplifying tube or not pass through said image amplifying tube.

19. The image amplifying tube system of claim 18, wherein said second driving motor accommodates the movement of said image amplifying tube causing said image amplifying tube to achieve optimum focus.

* * * * *